UNITED STATES PATENT OFFICE.

CHARLES G. EMERY, OF BROOKLYN, NEW YORK.

IMPROVEMENT IN CHEWING-TOBACCO.

Specification forming part of Letters Patent No. 214,639, dated April 22, 1879; application filed February 25, 1879.

*To all whom it may concern:*

Be it known that I, CHARLES GOODWIN EMERY, of the city of Brooklyn, in the county of Kings and State of New York, have invented a new and useful Improvement in the Manufacture and Preparation of Chewing-Tobacco; and that the following is a full, clear, and exact description thereof.

Chewing-tobacco as heretofore prepared and sold has been of two kinds, known as "fine-cut" and "plug" or "cavendish," which essentially differ from each other in form, condition, and character, and also in their mode of preparation.

Fine-cut chewing-tobacco is prepared and manufactured substantially in the following manner: The leaf is first dipped in or sprinkled with a saccharine solution, for the purpose of giving it a certain degree of sweetness. It is then left in this condition from ten to twenty hours, until thoroughly "drawn," as it is called, or impregnated with the moisture, so as to render it pliable, that the stem can be removed without breakage of the leaf. The leaves, after being stripped from the stems, are put into a machine, pressed to a solid cake, and cut into fine threads, strips, or shreds by a rapidly-revolving knife, and hence the distinguishing name "fine-cut." The cut tobacco is then dressed out or shaken out free, spread on screens, and dried by air or artificial heat. If it is desired to increase the sweetness of this kind of tobacco—fine-cut—a sweetening-powder is sprinkled or put with the leaf while in the machine, as it is practically impossible to cut into fine strips or shreds the fillers or stripped leaves if a heavily-sweetened liquid is used to immerse the leaves in without the tobacco becoming matted or pressed together. Fine-cut tobacco is thus only slightly sweet.

Plug-tobacco is generally made much sweeter than fine-cut, and is prepared and manufactured substantially in the following manner: The leaf is dampened with water or steam to enable the stem to be removed, sweetened or flavored solutions not being used for this purpose, as the stems, being porous, will absorb a large per cent. of the solution, thereby causing a considerable loss to the manufacturer, as the solution or sweetening fluid used in making plug-tobacco is much heavier than that used in fine-cut tobacco. The leaf is then dipped into a heavy saccharine solution and thoroughly saturated therewith, and is then run between rubber rollers, to more thoroughly impregnate the filler or stripped leaf with the sweetening, and leaving it in such condition that no loss takes place from drippings. The leaves are then placed on wire screens and subjected to a very high degree of heat until thoroughly dried or crisp. They are then blown with an atomizer or sprayer with some flavoring solution, and left to draw until in a pliable condition to be worked into plugs of any desired shape, size, or weight. These are covered with a leaf-tobacco wrapper, put into molds or forms, and subjected to heavy pressure until firmly set or fixed, when they are removed, packed in boxes or caddies, and ready for sale; or they may be pressed without such a wrapper and covered with foil. The leaf or filler in this operation is not cut up, except to desired lengths in making the plugs, and is used in a whole or unbroken condition. This tobacco, to be consumed, must be pulled apart or cut off with a knife or the teeth. It can readily be seen that tobacco manufactured in this manner must necessarily be sweeter than fine-cut, it being possible to load it with more than its own weight in sweetening material. There is also the advantage that the natural juice of the tobacco is not mingled with the sweetening, as when the leaf is cut, this being only extracted by the action of the saliva when in the mouth of the chewer.

My improvement in preparing chewing-tobacco is substantially as follows: The leaf is first dampened, which may be done with water or steam, so the stem can be removed. The fillers or stripped leaves are then dipped in a heavy sweetened solution, substantially as is ordinarily done in preparing plug-tobacco, so as to make the leaf considerably sweeter than are the fillers for ordinary fine-cut tobacco. The leaf is then partially dried, or sufficiently so that it can be cut, and is put in a machine, by which it is cut into shreds or strips, but very much coarser than the average fine-cut—say, from five to ten times coarser. Experiment has demonstrated that the leaf, when thus heavily sweetened, can be coarsely cut to about the degree mentioned, though it cannot in such condition be finely cut, as in ordinary fine-cut, without matting and pressing together. After the leaf has been thus coarsely cut it is properly dried, and then pressed by means of suitable molds or forms, either with or without a tobacco or other wrapper, or a tin-foil covering, or with both combined, into cakes of any required size, but usually of a flat oblong form, about the size of ordinary plugs, sufficiently hard and solid to form a firm, compact mass, which will retain its shape under ordinary handling and manipulation, but at the same time can be easily broken or separated by the fingers for use as a chewing-tobacco.

It will thus be seen that the process for carrying out my invention and the article produced thereby possess distinguishing characteristics, the chief of which may be mentioned, to wit: The tobacco-leaves, after being dampened or moistened to enable the stems to be removed, are saturated with a sweetening solution by absorption approximately to the degree that plug-tobacco is sweetened, and that the leaves thus treated are partially dried and then cut into coarse shreds or strips, after or during which cutting no sweetening solution should be or is necessary to be employed, the coarse shreds or strips thus prepared being immediately ready for pressing or compressing into a cake or mass prior to or after being provided with a suitable covering or wrapper. The product is thus a chewing-tobacco which combines the convenience of a cut tobacco and also the sweetness and compact condition of a plug-tobacco. The natural juices are also retained in the tobacco to a greater degree than when cut finely, like the common fine-cut tobacco.

Tobacco, after it has been pressed into plugs, may be coarsely cut and pressed as described; but a more desirable article is obtained if it is coarsely cut before it has been formed into plugs.

What is claimed as new is—

1. The improved process, substantially as described, of preparing chewing-tobacco, the same consisting in dampening tobacco-leaves for removing the stems, sweetening the leaves to saturation by absorption approximately to the degree that plug-tobacco is sweetened, partially drying the leaves, and then cutting the same into coarse shreds or strips, and finally pressing or compressing the coarse shreds or strips into a cake or compact mass prior to or after being provided with a suitable cover or wrapper, as and for the purpose set forth.

2. As a new manufacture, a pressed or compressed cake of cut chewing-tobacco made up of coarsely-cut tobacco-leaves, absorbently sweetened to saturation in approximate degree to plug-tobacco prior to cutting, substantially as set forth.

CHARLES G. EMERY.

Witnesses:
S. NELSON WHITE,
SAMUEL LEA.